United States Patent [19]

Yokoo

[11] Patent Number: 5,998,554

[45] Date of Patent: Dec. 7, 1999

[54] PROCESS FOR PRODUCING ACRYLIC RESINS EXCELLENT IN TOUGHNESS

[75] Inventor: Kazuhiro Yokoo, Ibaraki, Japan

[73] Assignee: Sumitomo Chemical Company, Limited, Osaka, Japan

[21] Appl. No.: 09/132,740

[22] Filed: Aug. 12, 1998

[30] Foreign Application Priority Data

Aug. 12, 1997 [JP] Japan .................................. 9-217351

[51] Int. Cl.$^6$ ...................................... C08F 2/00
[52] U.S. Cl. ......................... 526/201; 525/309; 525/310; 526/328.5
[58] Field of Search ................ 526/328.5, 201; 525/309, 310

[56] References Cited

U.S. PATENT DOCUMENTS 2,234,993  3/1941  Vernon et al. ..................... 526/328.5
3,459,699  8/1969  Levine et al. ..................... 526/328.5
4,287,317  9/1981  Kitagawa et al. .

FOREIGN PATENT DOCUMENTS 63-280713  11/1988  Japan .................................. 526/328.5

*Primary Examiner*—Bernard Lipman
*Assistant Examiner*—N. Sarofim
*Attorney, Agent, or Firm*—Sughrue, Mion, Zinn, Macpeak & Seas, PLLC

[57] ABSTRACT

A simple process for producing acrylic resins excellent in toughness was provided. The process comprises putting a monomer mixture comprising (i) 80 to 99 parts by weight of a methacrylic monomer containing 50% by weight or more of methyl methacrylate and (ii) 1 to 20 parts by weight of a diene-based rubber, in contact with a radical polymerization initiator, then pouring them in a mold and polymerizing the mixture.

6 Claims, No Drawings

PROCESS FOR PRODUCING ACRYLIC RESINS EXCELLENT IN TOUGHNESS

FIELD OF THE INVENTION

The present invention relates to a process for producing acrylic resins which are excellent in toughness and which are suitable for various molded products and sheet products including lenses.

BACKGROUND OF THE INVENTION

Acrylic resins have found applications in a variety of fields such as signboards, shades for lighting apparatuses and lenses, due to their excellent transparency and durability. While acrylic resins are hard to break as compared with glasses, sometimes they break depending on conditions and methods of use. Therefore, there has been a continuous demand for improving toughness of these resins.

Various methods have been known as methods for improving toughness of acrylic resins. For example, the Japanese Patent Application Laid-Open No. (JP) 62-13968-B, corresponding to the U.S. Pat. No. 4,287,317, discloses a process for continuously producing rubber-modified methyl methacrylate-based syrup. According to the disclosure, the syrup obtained in this process is suitable for polymerizing by cell-casting method to give an impact-resistant methacrylic resin plate.

The process, described by JP-62-13968-B (corresponding to the U.S. Pat. No. 4,287,317), in which the rubber-modified methyl methacrylate-based syrup is produced by a continuous bulk polymerization and poured into a cell to give a methacrylic resin plate (cell-casting method), is certainly a method suitable for producing a methacrylic resin plate having a high impact-resistance. This process, however, has many disadvantages from the industrial viewpoint, such that an apparatus for large-scale continuous bulk polymerization is needed and the conditions for continuous bulk polymerization have to be controlled in order to obtain a resin with a constant quality.

SUMMARY AND OBJECTS OF THE INVENTION

Under these circumstances, the present inventor has intensively investigated regarding a simple process for producing acrylic resins excellent in toughness. As a result, it has been found that acrylic resins excellent in toughness can be easily produced by putting a monomer mixture comprising a specific amount of a methacrylic monomer mainly containing a methyl methacrylate and a specific amount of diene-based rubber, in contact with a radical polymerization initiator, then pouring them in a mold and polymerizing the mixture.

Thus, the present invention provides a process for producing an acrylic resin which comprises putting a monomer mixture comprising (i) 80 to 99 parts by weight of a methacrylic monomer containing 50% by weight or more of methyl methacrylate and (ii) 1 to 20 parts by weight of a diene-based rubber, in contact with a radical polymerization initiator, then pouring them in a mold and polymerizing the mixture. According to the process of the present invention, acrylic resins having excellent toughness can be easily produced.

DETAILED DESCRIPTION OF THE INVENTION

The methacrylic monomer used in the present invention is a monomer containing 50% by weight or more of methyl methacrylate and optionally containing other co-polymerizable monomer(s).

Examples of the co-polymerizable monomer include monofunctional (meth)acrylates such as ethyl acrylate, butyl acrylate, 2-ethylhexyl acrylate, butyl methacrylate, phenyl methacrylate, benzyl methacrylate, cyclohexyl methacrylate, dicyclopentanyl methacrylate, glycidyl methacrylate, acrylic acid, methacrylic acid and 2-hydroxyethyl methacrylate; polyfunctional (meth) acrylates such as ethylene glycol diacrylate, ethylene glycol dimethacrylate, tetraethylene glycol dimethacrylate, neopentyl glycol dimethacrylate, hexanediol dimethacrylate, trimethylol propane trimethacrylate and compounds in which the terminal hydroxyl group of Bisphenol A or of alkylene oxide adduct of Bisphenol A is esterified with acrylic acid or methacrylic acid; styrene or derivatives thereof such as styrene, chlorostyrene and divinylbenzene; allyl methacrylate, diallyl phthalate, diethylene glycol bisallylcarbonate, acrylonitrile, methacrylonitrile, vinyl chloride, acrylamide and the like.

Here, the term "(meth)acrylates" represents both acrylates and methacrylates, and hereinafter, the term "(meth)" has an analogous meaning indicating the optional presence of a methyl substituent.

Among them, monomers of which homo-polymers have a refractive index of 1.52 or more, such as styrene, chlorostyrene, benzylmethacrylate and phenyl methacrylate, are preferred for use when transparency is required in the obtained acrylic resins, since they allow the acrylic resins to maintain transparency which tends to be deteriorated by the addition of diene-based rubber components.

The ratio of each monomer in the monomer mixture is preferably decided so that the refractive index of a co-polymer consisting of the monomer mixture is adjusted to the refractive index of the diene-based rubber which has been previously measured, although this adjustment depends on how large the refractive index of the diene-based rubber component actually used are. By such adjustment, it is possible to decide the composition of the monomer mixture that can give an acrylic resin having better transparency.

When a monomer having 2 or more carbon-carbon double bonds such as polyfunctional (meth)acrylates, divinylbenzene, allyl methacrylate or diallyl phthalate is used, it is possible to improve the impact-resistance of the obtained acrylic resins while maintaining the modulus of elasticity. These monomers are preferably used in a range of about 0.05 to about 5% by weight based on the monomer mixture.

In the present invention, the methacrylic monomer is used in a range of about 80 to about 99 parts by weight, based on 100 parts by weight of the monomer mixture.

Examples of the diene-based rubber include diene-based homo-polymers such as polybutadiene, hydrogenated polybutadiene, polyisoprene and polyisobutylene, and diene-based co-polymers made of monomers such as butadiene and methyl methacrylate, butadiene and styrene, or butadiene and acrylonitrile. These diene-based rubbers can be used independently or in combination of two or more.

It is preferred that the diene-based rubber is used by dissolving in the methacrylic monomer. The dissolving can be conducted by stirring at room temperature (about 20° C.) or at an elevated temperature.

The diene-based rubber is used in a range of about 1 to about 20 parts by weight, preferably in a range of about 2 to about 10 parts by weight, based on 100 parts by weight of the monomer mixture. When the amount is less than about 1 part by weight, the effect of giving toughness to the obtained resins is unsatisfactory. When the amount exceeds about 20 parts by weight, the dissolving of the diene-based rubber becomes difficult and sometimes the obtained resin is too soft. Therefore, these are not preferred.

In the present invention, a radical polymerization initiator is used, and examples thereof include peroxide-type radical polymerization initiator, azo-type radical polymerization initiator, and so-called redox-type radical polymerization initiator comprising a peroxide-type radical polymerization initiator, and a reducing agent or a metal-containing compound.

Examples of the azo-type radical polymerization initiator include azobisisobutyronitrile, azobiscyclohexanecarbonitrile, azobisdimethylvaleronitrile and the like.

Examples of the peroxide-type radical polymerization initiator include diacyl-type initiators such as lauroyl peroxide and benzoyl peroxide; peroxyester-type initiators such as t-butyl peroxybenzoate, t-butyl peroxyacetate, t-butyl peroxypivalate and t-butyl peroxy-2-ethylhexanoate; dialkyl-type initiators such as dicumyl peroxide and di-t-butyl peroxide; percarbonates such as diisopropyl peroxydicarbonate; ketone peroxides such as methyl ethyl ketone peroxide.

Examples of the redox-type radical polymerization initiator include various known initiators such as initiators composed of benzoyl peroxide and an organic amine; initiators composed of a peroxyester-type initiator as described above and a reducing agent such as a mercaptane; and initiators composed of methyl ethyl ketone peroxide and an organic cobalt salt.

Among these initiators, peroxide-type radical polymerization initiators are preferred, because a resin having a good toughness can tend to be obtained. Among the peroxide-type radical polymerization initiators, it is particularly preferred to use initiators having a high hydrogen-pulling capacity and a high grafting activity on a diene-based rubber. Specifically, it is preferred to use one or more diacyl-type initiators.

The amount of the initiator may be appropriately selected depending on polymerization conditions or others, and is usually in a range of about 0.05 to about 5 parts by weight based on 100 parts by weight of the monomer mixture.

In the present invention, additives such as mold release agent, ultraviolet absorber, thermal stabilizer, dye, pigment, plasticizer and light diffusing agent can be used, as required.

The mold release agent includes, for example, stearyl alcohol, stearic acid and nonionic or anionic surf actants.

It is also possible to additionally use resin components such as polymethacrylic resin or MS resin, namely a resin of co-polymer consisting of methyl methacrylate and styrene, in order to modulate viscosity of the monomer mixture or other items.

According to the present invention, various shape-moldings and plates can be obtained by pouring the monomer mixture and the radical polymerization initiator into a mold and polymerizing the mixture.

The step of putting the monomer mixture in contact with the radical polymerization initiator can be conducted by any method that is not particularly limited. The order of mixing the methacrylic monomer, the diene-based rubber and the radical polymerization initiator is also not particularly limited. For example, the mixing may either be carried out by adding the radical polymerization initiator to a prepared monomer mixture of the methacrylic monomer and the diene-based rubber, or by mixing almost simultaneously the methacrylic monomer, the diene-based rubber and the radical polymerization initiator. Preferably, the mixing is carried out by adding the radical polymerization initiator to a prepared monomer mixture of the methacrylic monomer and the diene-based rubber.

A mold into which the monomer mixture and the radical polymerization initiator are poured should have concave or hollow shape which allows transcription of a desired shape, and may be composed of materials such as glass, metal, resin and rubber. For example, when a lens product is desired, a mold having a concave corresponding to the lens is used.

In the polymerization, when production of sheet product is desired, it is possible to use a so-called glass cell composed of two glass plates, a sealing material and a cramp, or a so-called polymerization apparatus for continuous casting composed of two sets of endless metal belts and sealing materials.

The monomer mixture having co-existed radical polymerization initiator can be poured into a mold after filtering for removal of air or foreign matters if necessary, and be heated by means of an air bath or a water bath to elevate the temperature in order to effect polymerization. Upon completion of polymerization, the mold can be opened to give a resin product having a desired shape.

The polymerization conditions are appropriately selected depending on the composition of the monomer mixture, the shape and material of the mold and the method of heating. The conditions usually include a temperature in a range of about 50° C. to about 130° C. and a period of time for polymerization of about 1 to about 20 hours.

The present invention allows easier production of acrylic resin excellent in toughness, as compared with the conventional process. The present invention may be applied advantageously to the manufacture of products for various uses including displays, protecting covers, containers, signboards, guard plates and the like, as well as optical uses such as glass lenses, Fresnel lenses, lenticular lenses and mirrors.

The entire disclosure of the Japanese Patent Application No. 9-217351 filed on Aug. 12, 1997 indicating specification, claims and summary, are incorporated herein by reference in their entirety.

EXAMPLES

The present invention is described in more detail by reference of Examples, which should not be construed as a limitation upon the scope of the present invention.

In Examples, the measurement of physical properties was conducted by the following methods.
(1) Flexural modulus and Flexibility:
Flexural modulus and Flexibility were measured according to the method of ASTM D790.
(2) Izod impact value:
Izod impact value was measured according to the method of ASTM D256 using a sample having a thickness of 3 mm.
(3) Total light transmission (Tt) and Haze:
Tt and Haze were measured according to the method of ASTM D1003 with a haze-meter.
(4) Deflection temperature under load (DTUL):
DTUL was measured according to the method of JIS K7207 using an annealed sample.

Example 1

A mixture was prepared using 72 parts by weight of methyl methacrylate, 21.5 parts by weight of styrene and 0.5 part by weight of neopentyl glycol dimethacrylate as a methacrylic monomer; 6.0 parts by weight of Asaprene (polybutadiene-based rubber, manufactured by Asahi Kasei Kogyo) as a diene-based rubber; 0.1 part by weight of benzoyl peroxide and 0.1 part by weight of lauroyl peroxide as a radical polymerization initiators; and 0.1 part by weight of stearyl alcohol as a mold releasing agent.

The mixture was poured into a glass cell composed of glass plates and a soft sealing material and having a thickness of 3 mm, and was heated stepwise from 68° C. to 105° C. by air oven to effect polymerization.

The obtained resin plate had no problem in mold-releasing property. Physical properties of the resin plate obtained by releasing from the mold were measured. The following results were found: Flexural modulus was 14,000 kg/cm$^2$; Flexibility was 9% or more; and Izod impact value was 6.4 kg·cm/cm. These results indicated that the resin plate was excellent in toughness. As to transparency, Tt was 93% and Haze was 2%. DTUL was 97° C.

Example 2

The same procedure as in Example 1 was conducted except that the amount of neopentyl glycol dimethacrylate was 0.1 part by weight to give a resin plate.

The following physical properties were found for the obtained resin plate: Flexural modulus was 9,400 kg/cm$^2$; Flexibility was 9% or more; and Izod impact value was 5.7 kg·cm/cm. As to transparency, Tt was 93% and Haze was 2%. DTUL was 94° C.

Example 3

The same procedure as in Example 1 was conducted except that the amount of methyl methacrylate was 74.5 parts by weight, the amount of styrene was 22 parts by weight, the amount of neopentyl glycol dimethacrylate was 0.5 part by weight and the amount of Asaprene (manufactured by Asahi Kasei Kogyo) was 3.0 parts by weight to give a resin plate.

The following physical properties were found for the obtained resin plate: Flexural modulus was 21,500 kg/cm$^2$; Flexibility was 6%; and Izod impact value was 4.2 kg·cm/cm. As to transparency, Tt was 92% and Haze was 4%. DTUL was 105° C.

Example 4

The same procedure as in Example 1 was conducted except that the amount of methyl methacrylate was 75 parts by weight, the amount of styrene was 22 parts by weight, the amount of Asaprene (manufactured by Asahi Kasei Kogyo) was 3.0 parts by weight and neopentyl glycol dimethacrylate was not used to give a resin plate.

The following physical properties were found for the obtained resin plate: Flexural modulus was 18,000 kg/cm$^2$; Flexibility was 6%; and Izod impact value was 3.2 kg·cm/cm. As to transparency, Tt was 93% and Haze was 2%. DTUL was 102° C.

Example 5

The same procedure as in Example 1 was conducted except that, as the radical polymerization initiator, benzoyl peroxide and lauroyl peroxide were not used, and 0.15 part by weight of azoisobutyronitrile, an azo-type initiator, was used to give a resin plate.

The following physical properties were found for the obtained resin plate: Flexural modulus was 13,500 kg/cm$^2$; Flexibility was 7%; and Izod impact value was 5.2 kg·cm/cm. As to transparency, Tt was 93% and Haze was 3%. DTUL was 88° C.

Comparative Example 1

The same procedure as in Example 1 was conducted except that the amount of methyl methacrylate was 76.5 parts by weight, the amount of styrene was 23 parts by weight, the amount of neopentyl glycol dimethacrylate was 0.5 part by weight and no diene-based rubber was used to give a resin plate.

The following physical properties were found for the obtained resin plate: Flexural modulus was 29,500 kg/cm$^2$; Flexibility was 3%; and Izod impact value was 2.3 kg·cm/cm. These results indicated the resin plate was not good in toughness. As to transparency, Tt was 93% and Haze was 1%. DTUL was 104° C.

What is claimed is:

1. A process for producing an acrylic resin which comprises putting a monomer mixture comprising (i) 80 to 99 parts by weight of a methacrylic monomer containing 50% by weight or more of methyl methacrylate and (ii) 1 to 20 parts by weight of a diene-based rubber, in contact with a radical polymerization initiator, then pouring the resulting mixture in a mold and polymerizing the mixture, wherein all the polymerization is performed in a single step in said mold.

2. The process according to claim 1, wherein the methacrylic monomer contains a monomer having 2 or more carbon-carbon double bonds in an amount of 0.05 to 5 parts by weight based on 100 parts by weight of the monomer mixture.

3. The process according to claim 1, wherein the radical polymerization initiator is at least one peroxide-type radical polymerization initiator.

4. A process for producing an acrylic resin which consists essentially of putting a monomer mixture comprising (i) 80 to 99 parts by weight of a methacrylic monomer containing 50% by weight or more of methyl methacrylate and (ii) 1 to 20 parts by weight of a diene-based rubber, in contact with a radical polymerization initiator, then pouring the resulting mixture in a mold and polymerizing the mixture.

5. The process according to claim 1, wherein the acrylic resin article obtained by polymerizing the mixture has a flexural modulus of 21,500 kg/cm$^2$ or lower.

6. The process according to claim 4, wherein the acrylic resin article obtained by polymerizing the mixture has a flexural modulus of 21,500 kg/cm$^2$ or lower.

* * * * *